3,243,454
PROCESS OF PREPARING ALKALI METAL ISETHIONATES
Donald L. Klass, Barrington, and Thomas W. Martinek, Crystal Lake, Ill., assignors, by mesne assignments, to Union Oil Company of California, Los Angeles, Calif., a corporation of California
No Drawing. Filed Apr. 4, 1962, Ser. No. 184,939
6 Claims. (Cl. 260—513)

This invention relates to new and useful improvements in methods for the preparation of alkali metal salts of isethionic acid.

The preparation of the alkali metal salts of isethionic acid from ethylene oxide and an alkali metal bisulfite using high pressure equipment is known in the art (see Sexton et al. U.S. Patent 2,810,747). Similarly, Smith, U.S. Patent 2,899,461, discloses the preparation of alkali metal salts of isethionic acid by reaction of ethylene sulfite with an alkali metal carbonate or bicarbonate. The preparation of sodium isethionate has also been reported by reaction of sodium vinyl sulfonate with dilute aqueous sodium hydroxide, and also by the hydrolysis of carbyl sulfate (ethionic anhydride) with aqueous sodium hydroxide. In most cases, the isethionate salt which is obtained is contaminated with a by-product salt or unreacted material which is extremely difficult to separate. The prior art techniques of preparing the isethionate salts usually involves the production of sodium sulfate as a by-product, or the contamination of the product with unreacted sodium hydroxide. Sodium hydroxide and sodium sulfate are very difficult to separate from the sodium isethionate and it is therefore most difficult to obtain the isethionate salt in a substantially pure form.

In many instances, sulfate, hydroxide, and other impurities, such as those just described, are very objectionable in the sodium (or other alkali metal) isethionate product. Where the isethionate salt is employed as a reactant in further chemical reactions, e.g., in the making of detergents, these impurities may carry through into the resulting product or enter into by-product reactions forming further impurities, thereby contaminating that product. For example, in detergents made from an isethionate salt containing sulfite or bisulfite salts, these impurities may give rise to foul odors of mercaptan nature and are very objectionable.

It is therefore one object of this invention to provide a process for the preparation of alkali metal salts of isethionic acid which are completely free of impurities.

A feature of this invention is the provision of an improved process for the preparation of alkali metal isethionates from alkali metal vinyl sulfonates.

Another feature of this invention is the provision of a process for the preparation of alkali metal isethionates by boiling an aqueous solution of an alkali metal vinyl sulfonate in the absence of contaminating materials.

Other objects and features of this invention will become apparent from time to time throughout the specification and claims as hereinafter related.

This invention is based upon our discovery that alkali metal isethionates can be prepared in a form which is completely free of contaminating materials by simply boiling an aqueous solution of an alkali metal vinyl sulfonate in the absence of contaminating materials. The conversion of the alkali metal vinyl sulfonate to an alkali metal isethionate is substantially quantitative and the product which is obtained is completely free of contaminating materials. The process is preferably carried out at atmospheric pressure, although subatmospheric or superatmospheric pressures can be used but are less economical. In fact, the reaction will take place at temperatures as low as about 80° C., but the reaction requires a much longer time. A preferred method of carrying out our process is to reflux an aqueous solution of an alkali metal isethionate and then remove excess water by evaporation.

The following non-limiting examples illustrate the scope of our invention and, to a limited extent, compare our invention with the prior art.

*Example I*

A 5.0-g. portion of sodium vinyl sulfonate was dissolved in 50 ml. of water and the solution was refluxed for 6 hours, with air-blowing. Evaporation of the excess water gave sodium isethionate in quantitative yield. The identification of the product was by elemental analysis: calculated C, 16.22% wt., H, 3.40% wt., S, 21.65% wt., Na, 15.53% wt. Found: C, 16.8% wt., H, 3.4% wt., S, 22.2% wt., Na, 15.3% wt. Infrared analysis indicated no unsaturation in the product. It was therefore concluded that the product obtained was sodium isethionate completely free from contaminating materials.

When sodium vinyl sulfonate is dissolved in 50 ml. of water, and refluxed with mechanical stirring instead of air-blowing as the means of agitation, a substantially quantitative yield of isethionate is obtained as in the above experiment.

*Example II*

A 5.0-g. portion of vinyl sulfonic acid in water solution is treated with a stoichiometric amount of sodium hydroxide, and refluxed for six hours with air-blowing. Evaporation of excess water leaves sodium isethionate in substantially quantitative yield and free from contaminating by-products.

*Example III*

A 5.0-g. portion of potassium vinyl sulfonate is dissolved in 50 ml. water and the solution is refluxed for six hours, with air-blowing. Evaporation of the excess water yields potassium isethionate in substantially quantitative yield and free from contaminating by-products.

*Example IV*

A 5.0-g. portion of lithium vinyl sulfonate is dissolved in 50 ml. of water and the solution is refluxed for six hours, with mechanical stirring. Evaporation of the excess water gives lithium isethionate in substantially quantitative yield and substantially free from contaminating by-products.

*Example V*

One mol of carbyl sulfate is reacted in boiling water with 3 mols of sodium hydroxide to produce sodium isethionate in accordance with one prior art technique. The product which is obtained consists essentially of a mixture of sodium isethionate and sodium sulfate. It is exceedingly difficult to separate the sodium isethionate from the by-product sulfate.

*Example VI*

One mol of vinyl sulfonic acid and 1.5 mols of sodium hydroxide are mixed and boiled in aqueous solution for six hours. The product consists essentially of a mixture of sodium isethionate contaminated with sodium hydroxide. Because of the high water solubility of both products, it is exceedingly difficult to separate the sodium isethionate from the sodium hydroxide.

*Example VII*

One mol of sodium bisulfite and one mol of ethylene oxide are mixed in aqueous solution at a temperature of about 30° C. Sodium isethionate is formed in a yield of about 75% together with substantial quantities of contaminating by-products, including sodium sulfate and ethylene glycol.

*Example VIII*

One mol of ethylene sulfite and one mol of sodium hydroxide are dissolved in 150 ml. water and heated to about 90°–100° C. for two hours. Excess water is then evaporated from the product. The reaction product which is obtained consists of sodium isethionate containing a substantial amount of by-product sodium sulfate, and some unreacted sodium hydroxide.

While we have described our invention fully and completely with special emphasis upon several preferred embodiments, we wish it to be understood that within the scope of the appended claims the invention may be practiced otherwise than as specifically described herein. In particular, our invention can be carried out by heating any of the alkali metal vinyl sulfonates (including the lithium, sodium, potassium, rubidium, cesium, and francium salts) in aqueous solution. The reaction is preferably carried out at atmospheric pressure at about the boiling point of the solution, although temperatures in the range from about 80° to 120° C. are effective.

The embodiments of the invention in which an exclusive property or privilege is claimed are defined as follows:

1. A method of preparing an alkali metal isethionate which consists of boiling an aqueous solution of an alkali metal vinyl sulfonate at a temperature of about 80–120° C. under reflux conditions for a period of six hours in the absence of contaminating materials and then removing water by evaporation.

2. A method in accordance with claim 1 in which the reaction is carried out with continuous agitation.

3. A method in accordance with claim 1 in which the reaction is carried out at atmospheric pressure.

4. A method of preparing sodium isethionate which consists of refluxing an aqueous solution containing only sodium vinyl sulfonate at a temperature of about 80°–120° C. and under atmospheric pressure for a time sufficient to complete the reaction.

5. A method in accordance with claim 2 in which agitation is effected by means of air-blowing.

6. A method in accordance with claim 2 in which the agitation is mechanical.

References Cited by the Examiner

Kohler: Am. J. Chem., vol. 20 (1898), pp. 689, 690.

LORRAINE A. WEINBERGER, *Primary Examiner.*

LEON ZITVER, *Examiner.*

B. EISEN, M. WEBSTER, *Assistant Examiners.*